(12) United States Patent
Tyrrell et al.

(10) Patent No.: US 7,363,018 B2
(45) Date of Patent: Apr. 22, 2008

(54) HIGH SPEED ELECTRICAL INTERCONNECT USING AN OPTICALLY DISTRIBUTED CARRIER SIGNAL

(75) Inventors: Brian Tyrrell, Nashua, NH (US); Robert Reich, Tyngsborough, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 592 days.

(21) Appl. No.: 11/037,287

(22) Filed: Jan. 18, 2005

(65) Prior Publication Data
US 2006/0160574 A1 Jul. 20, 2006

(51) Int. Cl.
*H04B 1/26* (2006.01)
*H04B 10/00* (2006.01)
*G02F 1/35* (2006.01)
*G02B 6/36* (2006.01)

(52) U.S. Cl. ............. 455/313; 455/318; 455/328; 359/326; 385/88; 385/14; 398/163

(58) Field of Classification Search ........ 455/313–328; 359/326–332; 385/14, 88; 398/159, 163
See application file for complete search history.

(56) References Cited

U.S. PATENT DOCUMENTS

| | | | | |
|---|---|---|---|---|
| 4,663,596 | A * | 5/1987 | Heeks | 398/197 |
| 5,027,436 | A * | 6/1991 | Delavaux | 398/202 |
| 6,048,107 | A * | 4/2000 | Pubanz | 385/92 |
| 6,476,957 | B1 * | 11/2002 | Ward et al. | 359/326 |
| 6,599,031 | B2 * | 7/2003 | Li | 385/88 |
| 6,731,922 | B1 * | 5/2004 | Strutz et al. | 455/302 |
| 2003/0048998 | A1 | 3/2003 | Li | |
| 2004/0126065 | A1 * | 7/2004 | Levy et al. | 385/88 |
| 2004/0161250 | A1 | 8/2004 | Kozlowski et al. | |
| 2004/0184701 | A1 | 9/2004 | Barnett et al. | |

OTHER PUBLICATIONS

PCT/US05/044310 International Search Report dated Sep. 20, 2007, 2 pgs.
Chang, Richard T. et al.; "Near Speed-of-Light On-Chip Electrical Interconnect"; IEEE; 2002; pp. 18-21.
Chouteau, S. et al.; "Integrated Microwave Photoswitch on Silicon" Solid-State Electronics; 1998 Elsevier Science, Ltd.; vol. 42, No. 1, pp. 101-106.
Chang, Richard T. et al.; "Near Speed-of-Light Signaling Over On-Chip Electrical Interconnects" IEEE Journal of Solid-State Circuits; vol. 38, No. 5, pp. 834-838; May 2003.

(Continued)

*Primary Examiner*—Duc M. Nguyen
(74) *Attorney, Agent, or Firm*—Guerin & Rodriguez, LLP; William G. Guerin

(57) ABSTRACT

Described are a method and a device for high speed transmission of a data signal across an electrical interconnect in an integrated circuit. An optical carrier is modulated with a local oscillator signal at a modulation frequency substantially greater than the data signal to generate an optical local oscillator signal. Phototransducers at the ends of the interconnect illuminated by the optical local oscillator signal generate electrical local oscillator signals. At the transmit end of the interconnect, the data signal is mixed with an electrical local oscillator signal to generate an upconverted data signal. After transmission across the interconnect to the receive end, the upconverted data signal is mixed with the electrical local oscillator signal to retrieve the original data signal.

31 Claims, 5 Drawing Sheets

OTHER PUBLICATIONS

Chang, Richard T. et al.; "Near Speed-of-Light Velocities for On-Chip Transmission of Electrical . . . "; website: http://solidstate.articles.printthis.clickability.com/pt/cpt?action=cp&t . . . ; 4 pgs, 2002.

Wong, S. Simon et al.; On-Chip Interconnect Inductance—Friend or Foe (Invited); IEEE; Proceedings of the Fourth International Symposium on Quality Electronic Design (ISQED'03); 2003; pp. 1-6.

* cited by examiner

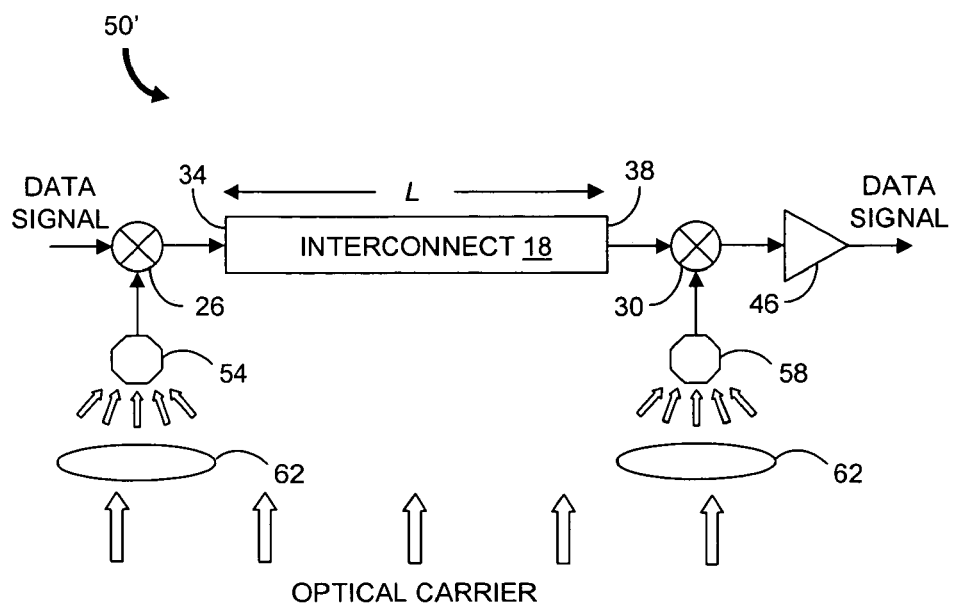
FIG. 6
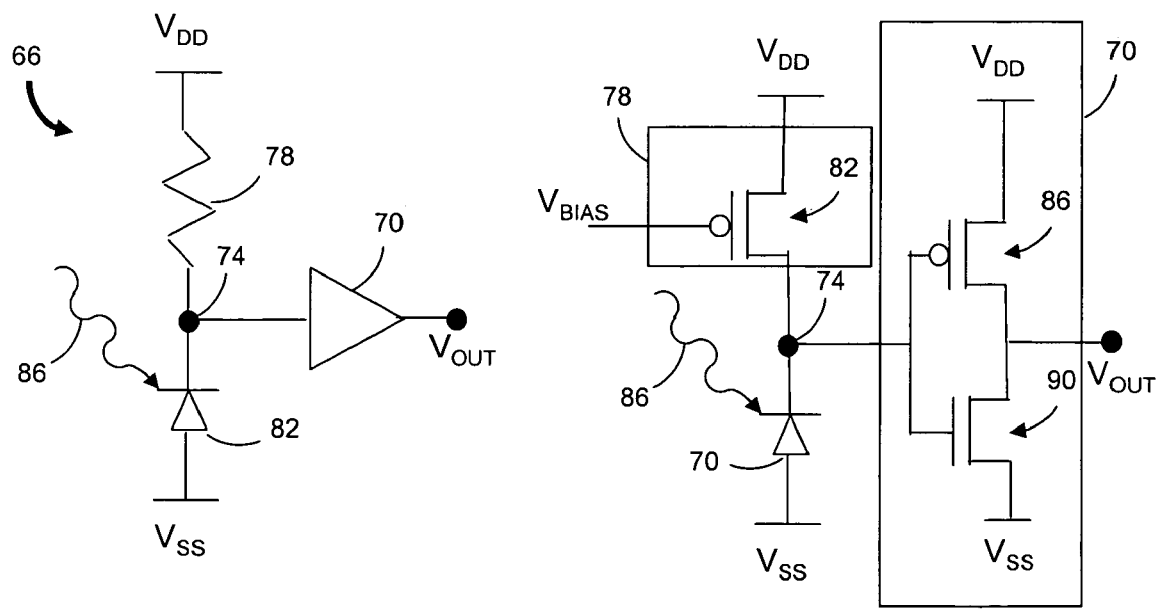
FIG. 7A    FIG. 7B

HIGH SPEED ELECTRICAL INTERCONNECT USING AN OPTICALLY DISTRIBUTED CARRIER SIGNAL

GOVERNMENT RIGHTS IN THE INVENTION

This invention was made with United States government support under Contract No. F19628-00-C-0002 awarded by the United States Air Force. The government may have certain rights in the invention.

FIELD OF THE INVENTION

The invention relates generally to high bandwidth data transmission in integrated circuits. More particularly, the invention relates to high speed transmission of electrical data signals across an interconnect using an optically distributed carrier signal.

BACKGROUND OF THE INVENTION

Advances in integrated circuit (IC) technology continue to occur at a rapid rate. On-chip elements and devices are fabricated in smaller sizes, allowing more devices to be fabricated on a chip. Also, chips are now being fabricated that are a few centimeters on a side. IC chip modules such as processors, digital-to-analog (D/A) converters and analog-to-digital (A/D) converters, CMOS active pixel sensors, application specific integrated circuits (ASICs), field programmable logic arrays, digital signal processors, and memory have increased in number and complexity, and generate additional data for on-chip communication. Higher data rates are utilized to keep pace with increased data and processor speeds and larger chip sizes. In some instances, the data rates are not sufficient, thus a demand for a greater numbers of interconnects (i.e., wires or waveguides to couple signals between chip modules) exists.

Technology has advanced to a level at which high speed performance is limited more by interconnect effects than the switching speed of IC semiconductor devices. Data transmitted across interconnects are affected by frequency dispersion, that is, the frequency components of the data signal propagate at different speeds across the interconnect, leading to temporal spreading of the data pulses. ICs are typically densely populated with devices and various elements; therefore it is often not possible to reduce the separation between the chip modules. Consequently, it may not be possible to reduce the length of interconnects between the chip modules. Other requirements such as minimum waveguide dimensions and minimum wire spacings to avoid signal coupling further limit the ability of the designer to achieve closer positioning of the chip modules. The lengths of the interconnects are a significant portion of the chip dimensions and, in some instances, the lengths approach or exceed 2 cm. Consequently, data signals transmitted across the interconnects are subjected to significant dispersion and can experience delays of hundreds of picoseconds or more.

One method for reducing the dispersion and delay of the data signal is based on transmitting optical data pulses across the interconnects. The additional on-chip complexity and increased cost, however, make optical interconnects undesirable for many applications.

Another method is based on mixing a local oscillator signal from an off-chip local oscillator with the data signal to generate an upconverted data signal. The upconverted data signal has frequency components at higher frequencies than the original data signal, consequently interconnect effects are dominated by inductance instead of resistance. After transmission across an interconnect, the upconverted data signal is mixed with the local oscillator signal. The resulting downconverted data signal is amplified and provided to the appropriate chip module. The local oscillator signal distributed to the two mixers requires accurate phase matching. Consequently, attention to path lengths for the local oscillator signal during IC layout and fabrication is critical. Moreover, amplifiers or regenerators may be required to support the distribution of the local oscillator signal across the chip.

SUMMARY OF THE INVENTION

In one aspect, the invention features a device for transmitting a data signal along a path in an integrated circuit. The device includes an interconnect, a first and a second phototransducer, and a first and a second mixer. The interconnect includes at least one electrically conductive path and has a transmit end and a receive end. Each phototransducer is adapted to generate an electrical signal in response to an incident optical signal. The first mixer has a first input terminal in electrical communication with the first phototransducer, a second input terminal to receive the data signal, and an upconvert output terminal in electrical communication with the transmit end of the interconnect. The first mixer provides an upconverted data signal at the upconvert output terminal in response to the data signal and a local oscillator signal emitted from an external optical source and incident on the first phototransducer. The second mixer has a first input terminal in electrical communication with the second phototransducer, a second input terminal in electrical communication with the receive end of the interconnect, and a downconvert output terminal. The second mixer provides the data signal at the downconvert output terminal in response to the upconverted data signal and the optical local oscillator signal emitted from the external optical source and incident on the second phototransducer.

In another aspect, the invention features a method for transmitting a data signal across an interconnect. An optical local oscillator signal incident adjacent to a transmit end of the interconnect is converted to a first electrical local oscillator signal. The data signal and the first electrical local oscillator signal are mixed to generate an upconverted signal. The upconverted signal is transmitted from the transmit end to a receive end of the interconnect.

In another aspect, the invention features a device for transmitting a data signal across an interconnect in an integrated circuit. The device includes means for converting an optical local oscillator signal incident adjacent to a transmit end of the interconnect to a first electrical local oscillator signal and means for mixing the first electrical local oscillator signal and the data signal to generate an upconverted signal at the transmit end of the interconnect.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

FIG. 6 is a functional block diagram depicting another embodiment of a device for transmitting an electrical signal across an interconnect in accordance with the invention.

FIG. 7A is a schematic illustration of a phototransducer for receiving an optical carrier signal in accordance with an embodiment of the invention.

FIG. 7B is a detailed schematic illustration of an example of the phototransducer of FIG. 7A.

DETAILED DESCRIPTION

In brief overview, the present invention relates to a method and device for transmitting a data signal across an electrical interconnect. An optical carrier is modulated with a local oscillator signal having a modulation frequency substantially greater than the data signal to generate an optical local oscillator signal. Phototransducers fabricated near the ends of the electrical interconnect in the integrated circuit are illuminated by the optical local oscillator signal. In response, the phototransducers generate electrical local oscillator signals. At the transmit end of the interconnect, the data signal is mixed with the electrical local oscillator signal to generate an upconverted data signal. At the receive end of the interconnect, the upconverted data signal is mixed with the electrical local oscillator signal to downconvert the upconverted data signal and thereby retrieve the original data signal. The method provides a significant advantage over prior methods of transmitting data across interconnects because chip area is not sacrificed to distribute the electrical local oscillator signal or to accommodate one or more on-chip oscillators.

Figure 1:
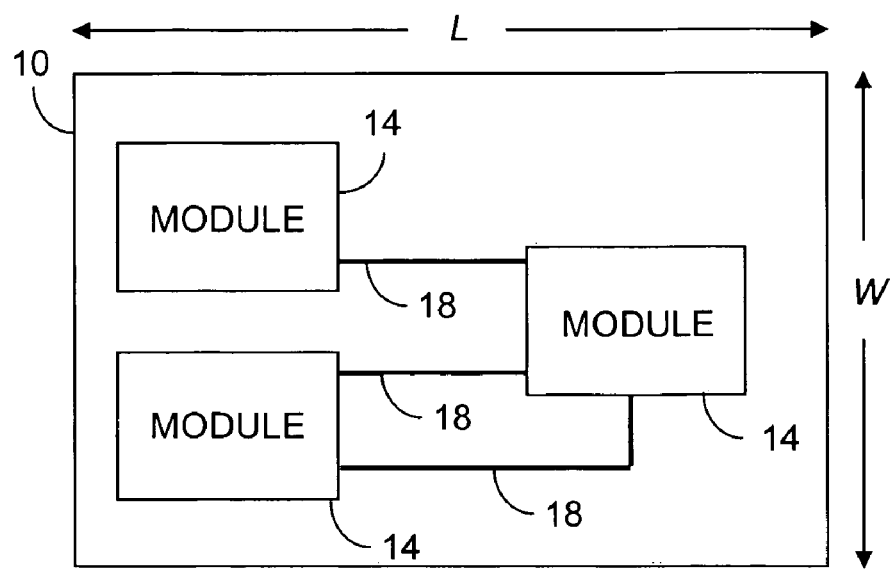
FIG. 1 is a functional block diagram showing interconnects for transmitting data between on-chip modules.

Referring to FIG. 1, an IC chip 10 includes, as an example, three chip modules 14 such as processors, D/A converters and A/D converters. Data is transmitted between the chip modules 14 along wires or waveguides 18 (hereafter referred to generally as interconnects 18). The chip 10 includes various other elements and devices (not shown) that restrict where the interconnects 18 are fabricated. The length L and width W of the chip 10 can be several centimeters, thus the length of the interconnects 18 be as great as 2 cm or more. Consequently, the delay in transmitting data between the chip modules 14 is based on the speed of the data pulses transmitted across the interconnects 18 and the length of the interconnects 18.

Figure 2:
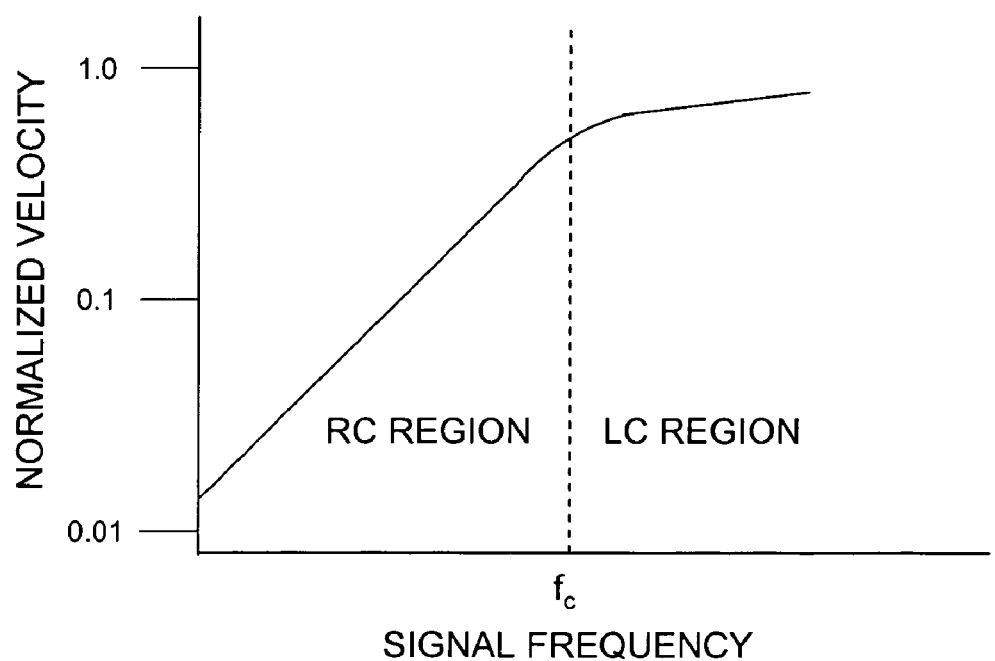
FIG. 2 is a graphical representation of the velocity of a signal in a waveguide normalized to the speed of light in the transmission medium of the waveguide as a function of signal frequency.

FIG. 2 illustrates the velocity of data transmitted across an interconnect normalized to the speed of light in the interconnect waveguide medium. Velocity is shown as a function of signal frequency. At frequencies lower than a crossover frequency $f_c$, the interconnect exhibits characteristics of a resistance-capacitance (RC) network. Consequently, signals at frequencies in this region propagate slowly and are subject to frequency dispersion. Because the different frequency components of data pulses propagate at different speed, pulse spreading occurs and the bandwidth of the signal is limited. As frequency increases, inductance effects in the interconnect increase until, at frequencies above the crossover frequency $f_c$, inductance effects dominate resistance effects. The crossover frequency $f_c$ is determined by the dielectric material properties, dielectric thickness and wire width of the interconnect. Higher frequency signals (e.g., greater than 1 Gbps) in the LC region experience substantially reduced dispersion in comparison to lower frequency signals corresponding to the RC region. In addition, higher frequency signals propagate at velocities close to the speed of light in the interconnect medium.

Figure 3:
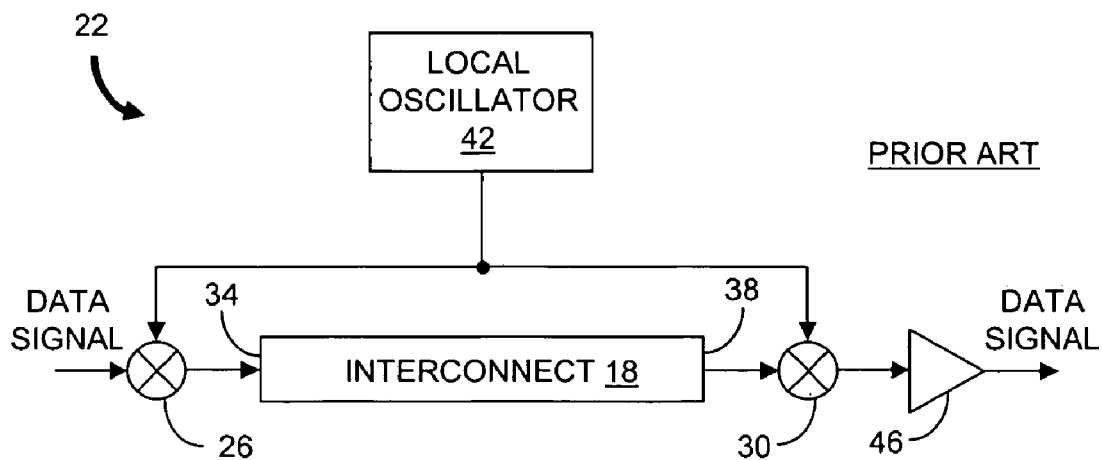
FIG. 3 is a functional block diagram depicting a device employing an electrical carrier to transmit a data signal across an interconnect.

The block diagram of FIG. 3 illustrates a device 22 for transmitting a data signal across an electrical interconnect 18 in an IC at speeds near to the speed of light as described in Chang et al., "Near Speed-of-Light On-Chip Electrical Interconnect," 2002 Symposium on VLSI Circuits Digest of Technical Papers, pp. 18-21, incorporated herein by reference. The device 22 exploits the benefits of transmission in the LC region (see FIG. 2) by upconverting the frequency of the data signal for transmission across the interconnect 18. The device 22 includes a transmit mixer 26 and a receive mixer 30 fabricated near the transmit end 34 and the receive end 38, respectively, of the interconnect 18. The device 22 also includes an off-chip local oscillator 42 which generates an electrical local oscillator signal. A series of distribution lines distribute the electrical local oscillator signal to the transmit mixers 26 and receive mixers 30 associated with multiple interconnects 18 in the IC.

Each transmit mixer 26 mixes the data signal and the electrical local oscillator signal to generate an upconverted data signal for transmission across the interconnect 18. For example, a data signal less than 1 Gbps can be mixed with a 10 GHz carrier to ensure the upconverted signal is well above a crossover frequency $f_c$ of approximately 1 GHz. Each receive mixer 30 mixes the upconverted signal after transmission across the respective interconnect 18 with the electrical local oscillator signal to retrieve the original data signal. Although dispersion is substantially reduced, some increase in signal attenuation is realized. A sense amplifier 46 is used to boost the attenuated data signal to signal levels appropriate for subsequent processing.

Although the device 22 achieves increased propagation speeds and decreased dispersion over other methods of transmitting a data signal across an interconnect, the distribution of the electrical local oscillator signal to the multiple transmit and receive mixers 30, 34 consumes valuable chip area which would otherwise be available for other purposes. Also, the distribution scheme of the electrical local oscillator signal can be complicated and may consume power that might otherwise be saved. Conserved chip area can be used for more chip components and devices. Alternatively, any conserved chip area can be used for additional interconnects 18 to transmit data signals. Moreover, the device 22 requires that the phase of the electrical local oscillator signal at each mixer 30, 34 be accurately controlled. Thus the layout of distribution lines for the electrical local oscillator signal, including the length of each distribution line, requires special attention during the chip design and fabrication processes.

Figure 4:
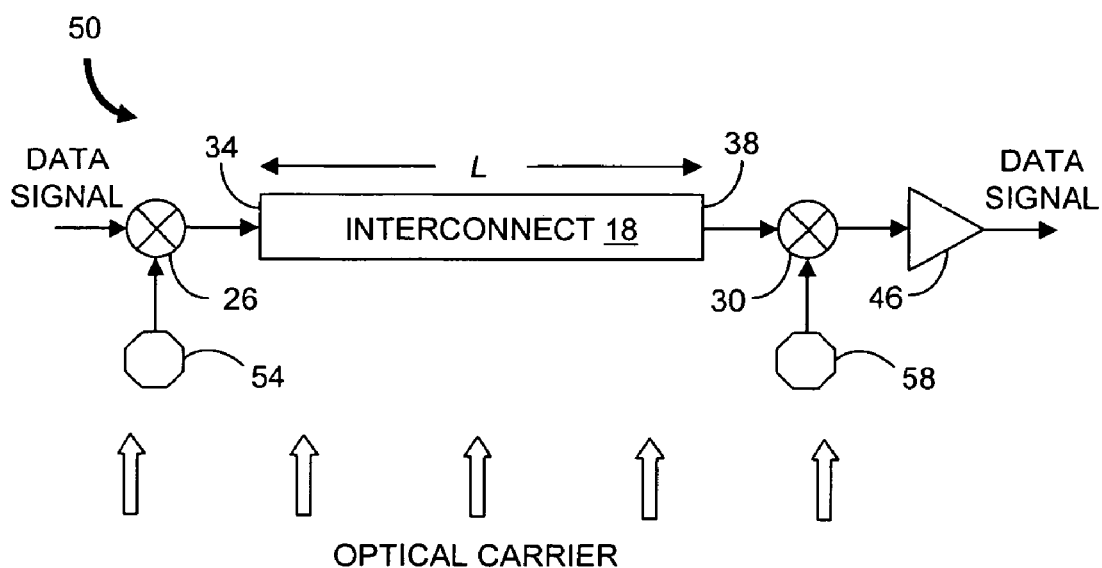
FIG. 4 is a functional block diagram depicting an embodiment of a device for transmitting an electrical signal across an interconnect in accordance with the invention.

FIG. 4 is a block diagram illustrating a device 50 for transmitting a data signal across an interconnect 18 in accordance with the principles of the invention. The device 50 includes a transmit phototransducer 54 and receive phototransducer 58 adjacent to the transmit end 34 and the receive end 38, respectively, of the interconnect 18 to generate electrical signals responsive to incident modulated optical signals. A transmit mixer 26 is electrically coupled to a data source, the transmit phototransducer 54 and the transmit end 34 of the interconnect 18. A receive mixer 30 is electrically coupled to the receive end 38 of the interconnect 18, the receive phototransducer 58 and a sense amplifier 46.

An optical carrier is intensity modulated in response to a local oscillator signal to generate an optical local oscillator signal for illumination of the device 50. The modulation phase of the optical local oscillator signal at each transmit phototransducer 54 is closely matched with the modulation phase of the optical local oscillator signal at each respective receive phototransducer 58 to ensure adequate demodulation of upconverted signals. For example, the differences in the optical path lengths defined between the optical source and each phototransducer 54, 58 should be approximately zero or an integer multiple of one-half the wavelength of the modulation waveform. Optical techniques, such as phase modulators (e.g. lithium niobate structures), can be used to control the relative phase of the distributed optical local oscillator signal to each phototransducer 54, 58. For a lithium niobate phase modulator, a bias voltage is applied to the material to create the appropriate phase shift for the particular phototransducer 54, 58. Additionally, the length L of each interconnect 18 is fabricated such that the phase of an electrical local oscillator signal generated by the receive phototransducer 58 at the receive end 38 is known relative to the phase of an electrical local oscillator signal generated by the transmit phototransducer 54 at the transmit end 34 and propagated across the interconnect 18. Preferably the length of the interconnect 18 is fabricated to be an integer multiple of one-half the wavelength of the electrical local oscillator signal.

Figure 5:
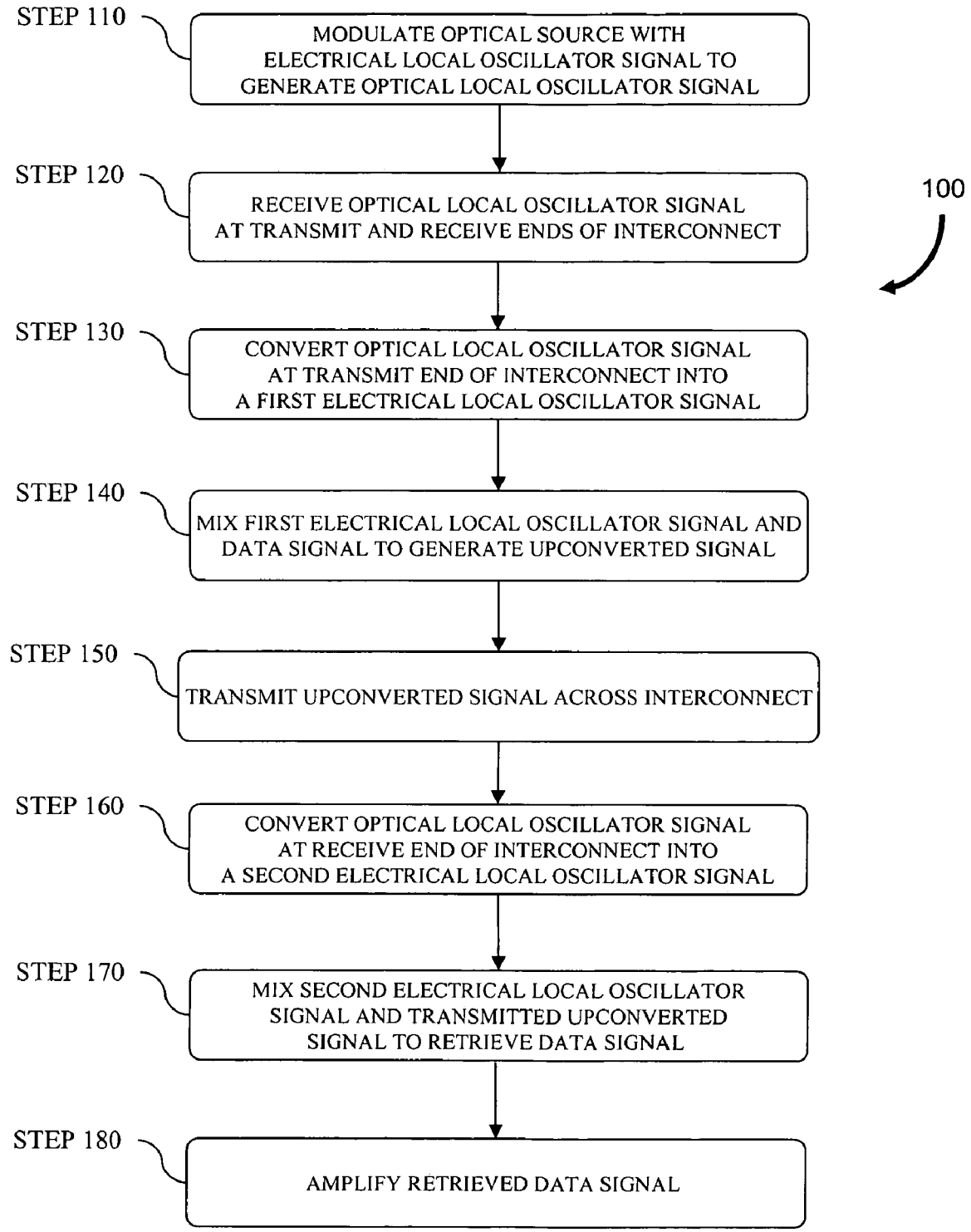
FIG. 5 is a flowchart representation of an embodiment of a method for transmitting a data signal across an interconnect in accordance with the invention.

Referring also to FIG. 5 which shows a flowchart representing an embodiment of a method 100 for transmitting a data signal across an interconnect, an external (i.e., "off-chip") optical source is used to generate an optical carrier signal. An external oscillator generates an electrical oscillator signal to modulate (step 110) the external optical source. Modulation is achieved directly, for example, by applying the electrical local oscillator signal to the external optical source to generate an intensity-modulated optical signal. Alternatively, the electrical local oscillator signal drives an intensity modulator disposed in the optical beam emitted by the external optical source. In some embodiments not described herein, there is no external oscillator that is separate from the external oscillator source. For example, the intensity-modulated optical signal can be achieved with a laser providing an optical pulse train.

The intensity-modulated optical signal, i.e., the optical local oscillator signal, is incident on the device 50 and is received (step 120) at the transmit and receive phototransducers 54, 58. In response to the optical local oscillator signal, the transmit phototransducer 54 generates (step 130) an electrical local oscillator signal which is mixed (step 140) with the data signal to generate an upconverted signal for transmission (step 150) across the interconnect 18. The receive phototransducer 58 also generates (step 160) the electrical local oscillator signal which is mixed (step 170) with the upconverted signal to retrieve the original data signal. The sense amplifier 46 boosts (step 180) the retrieved data signal to an appropriate signal level for processing by a chip module 14 or device.

Due to the limited active areas of the phototransducers 54, 58, only a small portion of the optical local oscillator signal transmitted from the external optical source is available for conversion to an electrical local oscillator signal. FIG. 6 illustrates an embodiment of a device 50' that utilizes more of the optical power of the optical local oscillator signal to generate the electrical local oscillator signals. The device 50' is similar to the device 50 of FIG. 4 but also includes a "lenslet" 62 or microlens fabricated above each phototransducer 54, 58. Lenslet apertures are generally customized according to a particular implementation on a chip, but can range in area from a few square microns to hundreds of square microns. Likewise, lenslet focal lengths can range from a few microns to hundreds of microns, depending on the application. Each lenslet 62 transmits the optical energy incident across the lenslet aperture onto the active area of a respective phototransducer 54, 58. For example, the separation between a lenslet 62 and a respective phototransducer 54, 58 can be the focal length of the lenslet. Thus the conversion from an optical local oscillator signal to an electrical local oscillator signal is more efficient and can reduce or eliminate the need for signal amplification. Amplification of the retrieved data signal at the receive end 38 of the interconnect 18 may still be necessary.

Various types of high-speed photosensitive devices can be used to implement the phototransducers 54, 58. For example, silicon photodiodes fabricated on silicon-on-insulator (SOI) substrates can operate at low bias voltages and permit easy integration using standard transistor fabrication processes. For wavelengths typically used for optical communication, photodiodes fabricated on SOI layers exhibit faster response times than those fabricated in bulk silicon. The carriers generated in the SOI are collected by a high drift field that accelerates the photocarriers to the n+/p+ regions. Photodiodes fabricated in bulk silicon are limited in speed by a diffusion "tail" in their response caused by the slower collection of photocarriers created in a silicon region below the n+/p+ junctions where the drift field is comparatively weak.

FIG. 7A illustrates one example of a photodetector circuit 66 to implement the transmit phototransducer 54 or the receive phototransducer 58. The photodetector circuit 66 includes a buffer 70 in communication with a node 74 between a serially coupled resistive element 78 and photodiode 82. The buffer 70 produces the electrical local oscillator signal (designated as output voltage $V_{OUT}$) in response to the optical local oscillator signal 86 incident on the photodiode 82. FIG. 7B illustrates a detailed implementation of the photodetector circuit 66 of FIG. 7A. The resistive element 78 is a field effect transistor (FET) 82 having a drain coupled to the node 74. The FET 82 is biased for linear operation. The buffer 70 is a CMOS inverter that includes two FETs 86 and 90.

A variety of mixer circuits as are known in the art can be used to implement the transmit and receive mixers 26, 30. The appropriate mixer circuit design depends on the requirements of the device 50 and the particular semiconductor fabrication process employed. Depending on the type of mixer 26, 30 used, the electrical local oscillator signal can be converted to a differential signal format or can be converted to a quadrature signal using a phase shifter circuit. Moreover, mixer circuits often include filters to achieve the desired operation by removing unwanted frequency components.

Figure 8:
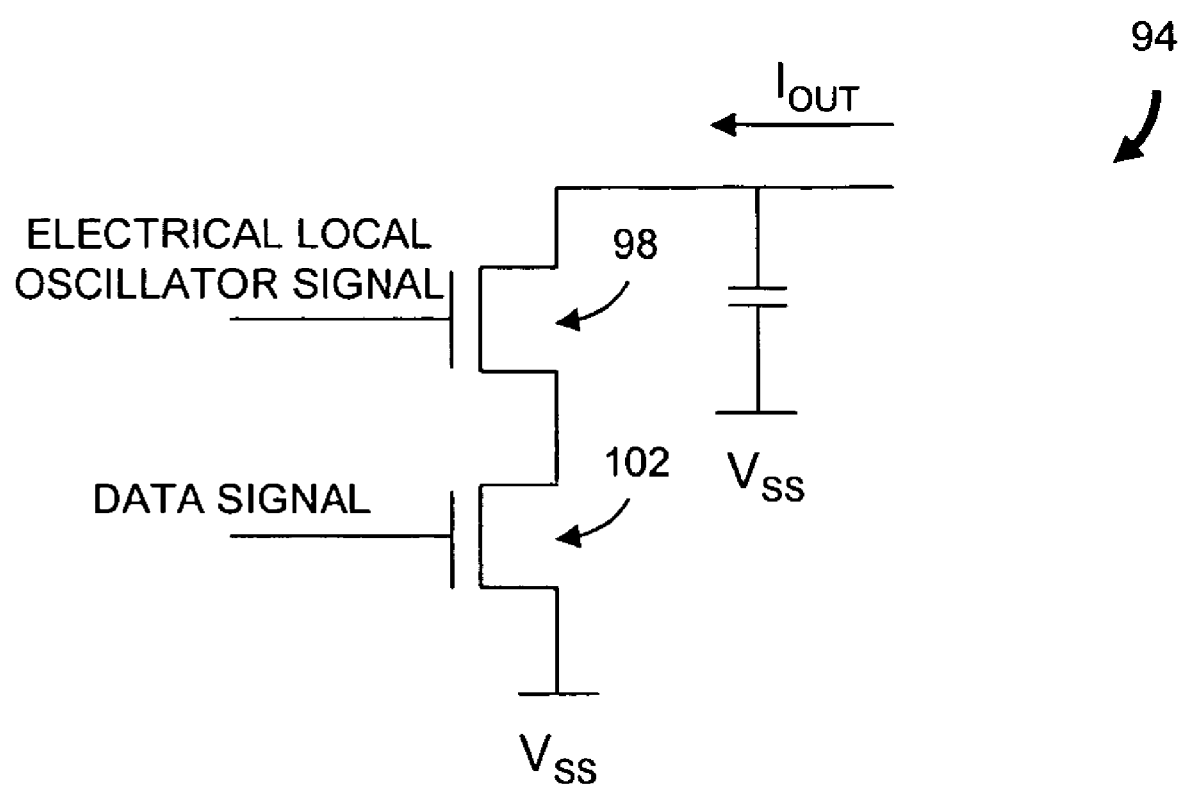
FIG. 8 is an illustration of an exemplary mixer for mixing a data signal and an electrical local oscillator signal in accordance with an embodiment of the invention.

FIG. 8 shows a mixer circuit 94 in which active FETs are used to implement the transmit mixer 26. The circuit 94 includes two FETs 98 and 102 in a serial configuration. The electrical local oscillator signal is applied to the gate of one FET 98 and the data signal is applied to the gate of the other FET 102. The output signal $I_{OUT}$ represents the upconverted signal to be transmitted across the interconnect 18. A similar mixer circuit can be used to implement the receive mixer 30. In this instance, the electrical local oscillator signal is mixed with the upconverted signal after transmission across the interconnect 18. In other mixer implementations, diode mixers, balanced mixers, passive mixers, and the like can be used. In one embodiment, the phototransducer 54 or 58 is used as the active element of a single-ended mixer. In this instance, the conductance of the phototransducer 54, 58 is modulated by the electrical local oscillator signal.

While the invention has been shown and described with reference to specific embodiments, it should be understood by those skilled in the art that various changes in form and detail may be made therein without departing from the spirit and scope of the invention. For example, other implementations of phototransducers and mixers are possible using semiconductor devices having reversed polarities and complementary structures, and fabricated according to various semiconductor fabrication processes as are known in the art. Other circuit topologies for phototransducers and mixers as are known in the art are also contemplated under the principles of the invention.

What is claimed is:

1. A device for transmitting a data signal along a path in a circuit, comprising:
    an interconnect comprising at least one electrically conductive path and having a transmit end and a receive end;
    a first phototransducer and a second phototransducer each adapted to generate an electrical signal in response to an incident optical signal;
    a first mixer having a first input terminal in electrical communication with the first phototransducer, a second input terminal to receive the data signal, and an upconvert output terminal in electrical communication with the transmit end of the interconnect, the first mixer providing an upconverted data signal at the upconvert output terminal in response to the data signal and a local oscillator signal emitted from an external optical source and incident on the first phototransducer;
    a second mixer having a first input terminal in electrical communication with the second phototransducer, a second input terminal in electrical communication with the receive end of the interconnect, and a downconvert output terminal, the second mixer providing the data signal at the downconvert output terminal in response to the upconverted data signal and the optical local oscillator signal emitted from the external optical source and incident on the second phototransducer.

2. The device of claim 1 wherein the interconnect comprises an electrical waveguide.

3. The device of claim 1 further comprising a lenslet in communication with one of the first and second phototransducers, the lenslet transmitting a portion of the energy of the optical local oscillator signal to the respective phototransducer.

4. The device of claim 1 further comprising a sense amplifier in electrical communication with the downconvert output terminal of the second mixer.

5. The device of claim 1 further comprising the external optical source in optical communication with the first phototransducer and the second phototransducer, the external optical source configured to illuminate the first and second phototransducers with the optical local oscillator signal so that a predetermined modulation phase difference is defined between the optical local oscillator signal at the first and second phototransducers.

6. The device of claim 5 further comprising an external oscillator in communication with the external optical source, the external optical source emitting the optical local oscillator signal in response to an oscillator signal generated by the external oscillator.

7. The device of claim 5 further comprising an intensity modulator in communication with the external optical source, the intensity modulator imparting an intensity modulation to an optical beam emitted from the external optical source in response to an oscillator signal.

8. The device of claim 5 further comprising:
    an external oscillator; and
    an intensity modulator in communication with the external oscillator and in optical communication with the external optical source, the intensity modulator imparting an intensity modulation to an optical beam emitted from the external optical source in response to an oscillator signal generated by the external oscillator.

9. The device of claim 1 wherein at least one of the first and second phototransducers comprises:
    a transistor having a drain and being adapted for linear operation upon application of a bias voltage;
    a photodiode electrically coupled to the drain of the transistor; and
    a buffer electrically coupled to the drain of the transistor.

10. The device of claim 9 wherein the transistor, the photodiode and the buffer are fabricated in a silicon-on-insulator layer.

11. The device of claim 9 wherein the buffer comprises a CMOS inverter.

12. The device of claim 9 wherein the buffer comprises an amplifier.

13. The device of claim 1 wherein at least one of the first and second mixers comprises a first transistor and a second transistor each having a gate, a drain and a source, the drain of the first transistor being electrically coupled to the source of the second transistor, one of the gates of the first and second transistors adapted to receive the electrical local oscillator signal and the other of the gates adapted to receive a data signal, a current being generated at the drain of the second transistor in response to the electrical local oscillator signal and the data signal.

14. The device of claim 13 wherein the data signal comprises data to be transmitted across the interconnect.

15. The device of claim 13 wherein the data signal comprises an upconverted data signal transmitted across the interconnect.

16. The device of claim 1 wherein the interconnect has a length defined between the transmit end and the receive end, the length being predetermined to provide a known relative phase between the upconverted data signal at the transmit and the receive ends of the interconnect.

17. A method for transmitting a data signal across an interconnect, the method comprising:
    converting an optical local oscillator signal incident adjacent to a transmit end of the interconnect to a first electrical local oscillator signal;
    mixing the first electrical local oscillator signal and the data signal to generate an upconverted signal;
    transmitting the upconverted signal from the transmit end to a receive end of the interconnect;
    converting an optical local oscillator signal incident adjacent to the receive end of the interconnect to a second electrical local oscillator signal, the optical local oscillator signals incident adjacent to the transmit and receive ends having a predetermined modulation phase difference; and mixing the second electrical local oscillator signal and the transmitted upconverted signal to retrieve the data signal.

18. The method of claim 17 wherein the optical local oscillator signals adjacent to the transmit and receive ends have a predetermined modulation phase difference.

19. The method of claim 17 further comprising amplifying the retrieved data signal.

20. The method of claim 17 wherein the transmission along the interconnect causes a predetermined phase difference between the upconverted signal at the receive end of the interconnect and the second electrical local oscillator signal.

21. The method of claim 17 wherein the optical local oscillator signals incident adjacent to the transmit end and the receive end are the same signal.

22. The method of claim 17 further comprising modulating an external optical source to generate the optical local oscillator signals.

23. The method of claim 17 further comprising intensity modulating an optical beam emitted by the external optical source to generate the optical local oscillator signals.

24. A method for transmitting a data signal across an interconnect, the method comprising:

converting an optical local oscillator signal incident adjacent to a transmit end of the interconnect to a first electrical local oscillator signal;

mixing the first electrical local oscillator signal and the data signal to generate an upconverted signal;

transmitting the upconverted signal from the transmit end to a receive end of the interconnect;

converting an optical local oscillator signal incident adjacent to the receive end of the interconnect to a second electrical local oscillator signal; and mixing the second electrical local oscillator signal and the transmitted upconverted signal to retrieve the data signal.

25. The method of claim 24 wherein the optical local oscillator signals incident adjacent to the transmit and receive ends having a predetermined modulation phase difference.

26. The method of claim 24 wherein the transmission along the interconnect causes a predetermined phase difference between the upconverted signal at the receive end of the interconnect and the second electrical local oscillator signal.

27. The method of claim 24 further comprising amplifying the retrieved data signal.

28. The method of claim 24 wherein the optical local oscillator signals incident adjacent to the transmit end and the receive end are the same signal.

29. The method of claim 24 further comprising modulating an external optical source to generate the optical local oscillator signals.

30. The method of claim 24 further comprising intensity modulating an optical beam emitted by an external optical source to generate the optical local oscillator signals.

31. A device for transmitting a data signal across an interconnect in an integrated circuit, comprising:

means for converting an optical local oscillator signal incident adjacent to a transmit end of the interconnect to a first electrical local oscillator signal;

means for mixing the first electrical local oscillator signal and the data signal to generate an upconverted signal at the transmit end of the interconnect;

means for converting an optical local oscillator signal incident adjacent to the receive end of the interconnect to a second electrical local oscillator signal having a predetermined modulation phase difference with respect to the first electrical local oscillator signal at the transmit end of the interconnect; and means for mixing the second electrical local oscillator signal and the transmitted upconverted signal to retrieve the data signal.

* * * * *

UNITED STATES PATENT AND TRADEMARK OFFICE
CERTIFICATE OF CORRECTION

| | | |
|---|---|---|
| PATENT NO. | : 7,363,018 B2 | Page 1 of 1 |
| APPLICATION NO. | : 11/037287 | |
| DATED | : April 22, 2008 | |
| INVENTOR(S) | : Tyrrell et al. | |

It is certified that error appears in the above-identified patent and that said Letters Patent is hereby corrected as shown below:

In column 1, delete the entire paragraph that starts at line 7 and ends at line 10.

In column 1, insert the following paragraph at line 7:

--This invention was made with government support under Grant No. F19628-00-C-0002 awarded by the U.S. Air Force. The government has certain rights in this invention.--

Signed and Sealed this
Seventeenth Day of May, 2011

David J. Kappos
*Director of the United States Patent and Trademark Office*